Patented Aug. 21, 1923.

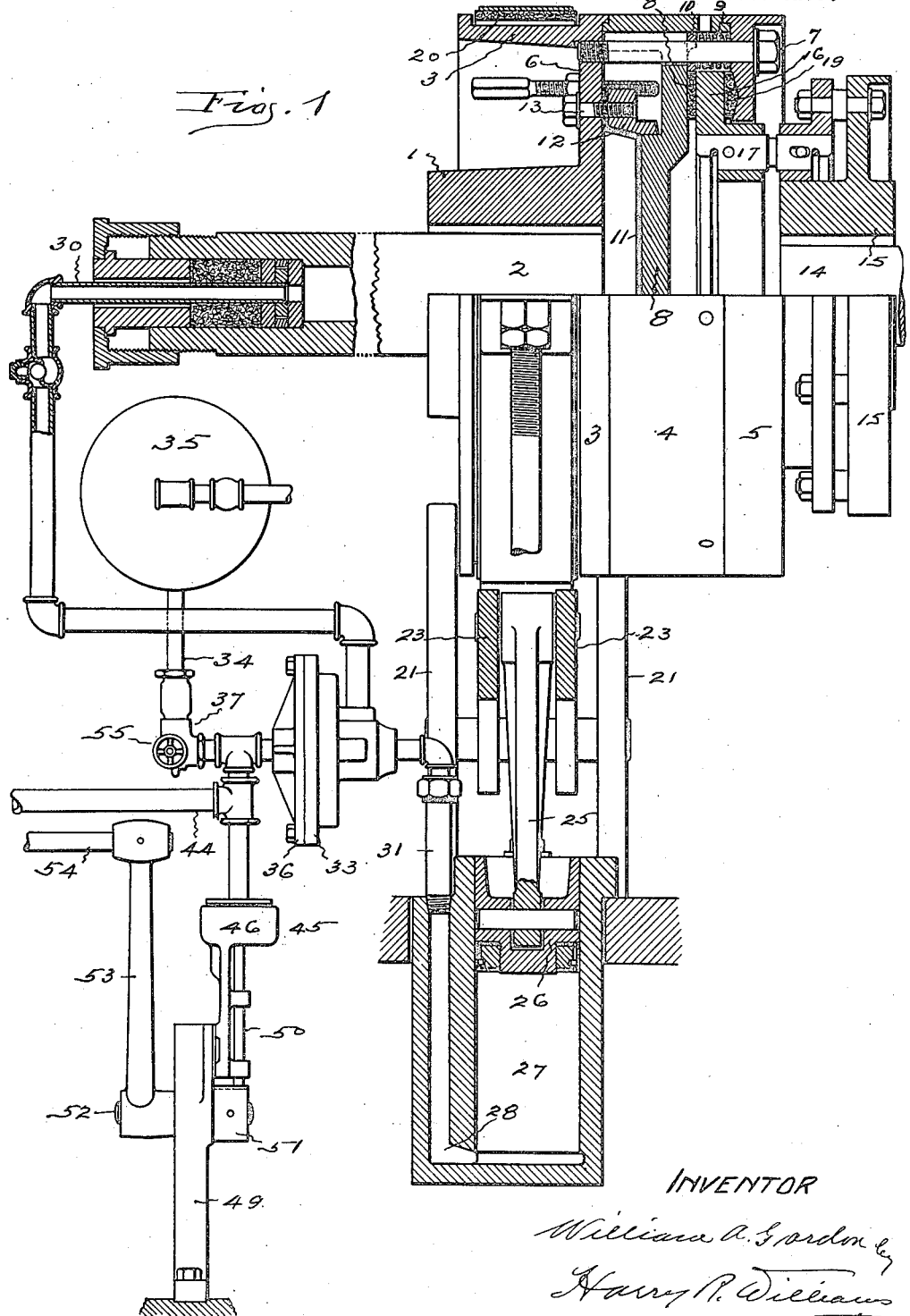

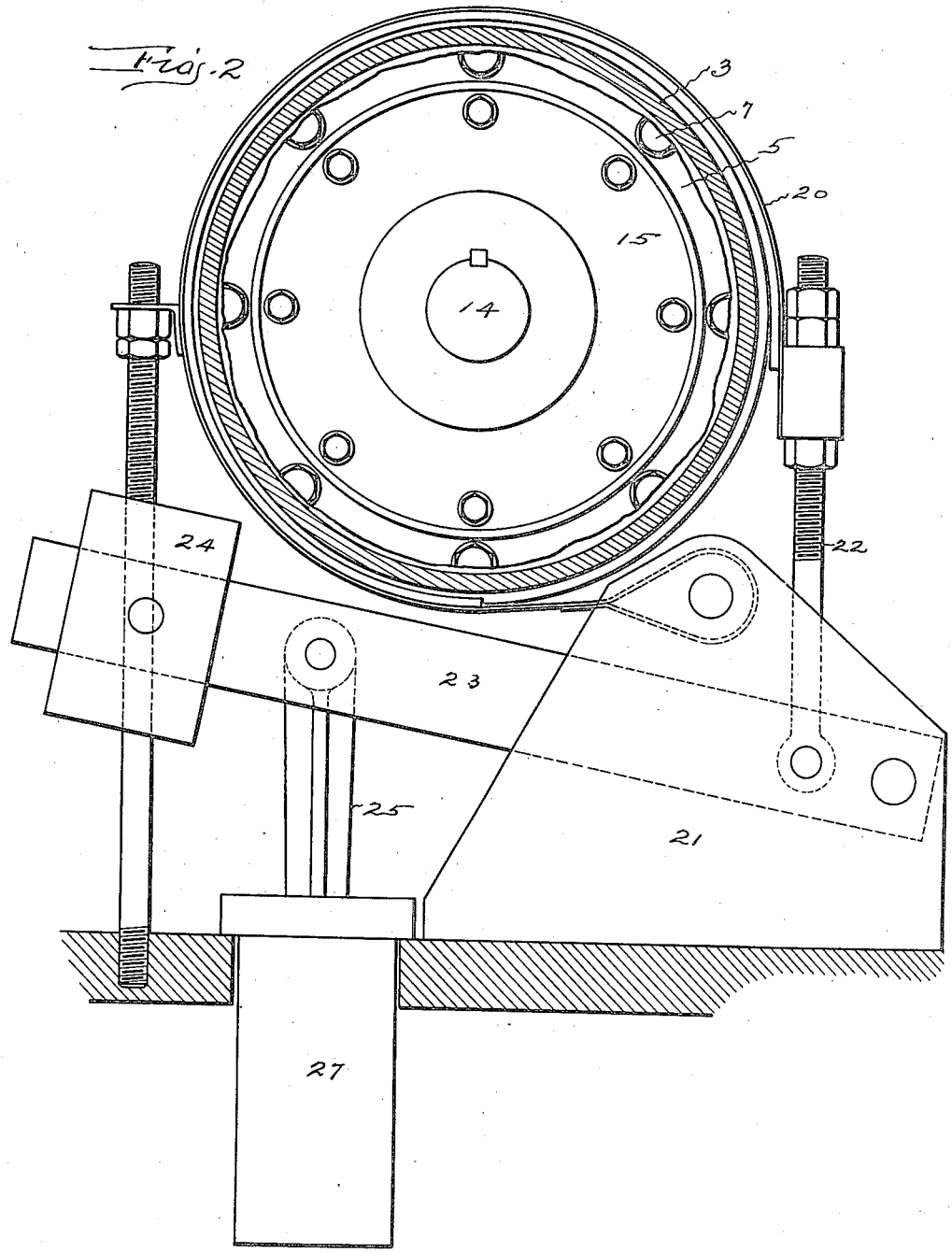

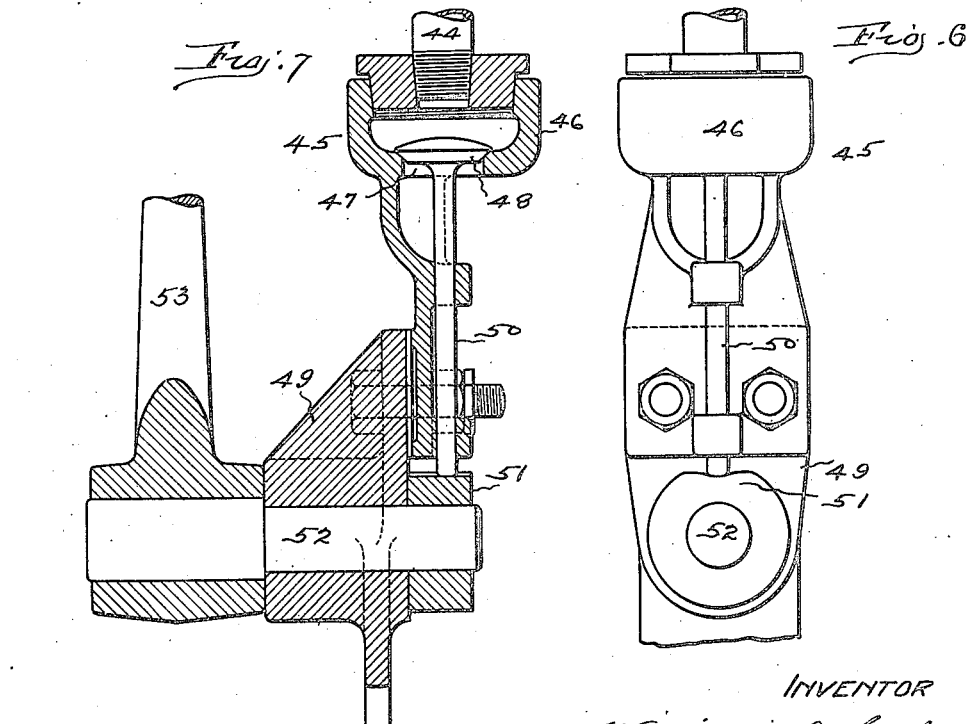

1,465,431

UNITED STATES PATENT OFFICE.

WILLIAM A. GORDON, OF SHELTON, CONNECTICUT, ASSIGNOR TO THE BIRMINGHAM IRON FOUNDRY, OF DERBY, CONNECTICUT, A CORPORATION OF CONNECTICUT.

PNEUMATIC-CLUTCH CONTROL.

Application filed December 20, 1922. Serial No. 607,968.

*To all whom it may concern:*

Be it known that I, WILLIAM A. GORDON, a citizen of the United States, residing at Shelton, in the county of Fairfield and State of Connecticut, have invented a new and useful Improvement in Pneumatic-Clutch Controls, of which the following is a specification.

Many kinds of heavy machines, for instance rubber mill machines, are connected with their driving shafts by clutches actuated by air pressure, for example such clutches as are described in United States patent to W. A. Gordon No. 1,360,394, November 30, 1920. It is necessary in numerous cases, in event of accident or when the product is not coming through as desired, to be able to operate these clutches and stop the machines quickly. This invention relates to means provided for controlling such clutches.

The object of the invention is to provide a simple, reliable and quickly operating system which may be readily installed in connection with a single or series of machines whereby a pneumatic clutch may be set and a brake released when it is desired to operate the machines, or the clutch may be instantly released and the brake set by anyone at any of the machines in case it is necessary to shut down on account of accident or faulty product.

This end is attained by locating in the connection between the clutch and brake and the source of compressed air for operating these, a control valve and an automatic check valve, and connecting a safety or outlet valve, located near each machine or other desired locality and provided with means for opening it, between the check valve and the control valve, which elements and connections are so made that when one of the safety valves is opened the check valve closes and shuts off the pressure from the air reservoir, and the control valve is operated to exhaust the pressure from the clutch and from the means employed to hold the brake off.

In the accompanying drawings Figure 1 shows an elevation of a clutch and braking means, with parts in section, and a representation of the control connections which include the control valve, automatic check valve and a safety or outlet valve. Fig. 2 shows a section of the clutch and a side elevation of the braking mechanism. Fig. 3 on larger scale shows a face view of the control valve. Fig. 4 shows a diametrical section of the control valve on the plane indicated by the dotted line 4—4 on Fig. 3, with the parts in the positions occupied when the control valve is open. Fig. 5 is a section on the plane indicated by the dotted line 5—5 on Fig. 3 showing the control valve closed. Fig. 6 shows an elevation of a safety or outlet valve. Fig. 7 is a vertical section of the safety valve.

The pneumatic clutch illustrated is similar to that which forms the subject of the patent above mentioned. It has a driven hub 1 keyed to the hollow driven shaft 2, and on the hub is a brake drum 3. The cylindrical casing 4 and the end plate 5 are secured to the driven hub web 6 by screw bolts 7. In the casing is a piston 8. On the bolts which fasten the parts together and pass through the edge of the piston are springs 9 which thrust between the inner wall of the end plate and washers 10 loose on the bolts back of the piston, and tend to force the piston away from the end plate toward the web of the driven hub and release the clutch.

Between the piston and the web of the driven hub is a packing diaphragm 11 of rubber or similar flexible and elastic material. The outer edge of the diaphragm is fastened to the inner wall of the web of the hub by a clamping ring 12 that is secured by screw bolts 13 which pass through the web.

The driving shaft 14 is shown as keyed to the hub 15 of one member of a flexible coupling of common and well known type. The other member of this coupling has a flange 16. These coupling members are connected by flexible metallic strips 17. On one face of the flange or inner member of the coupling is a flat clutch ring 18 and on the other face of the flange is a clutch ring 19 which is beveled and fitted in a beveled recess in the end plate. These clutch rings are made of any common, durable, wear-resisting clutch facing material.

When fluid pressure is permitted to enter the casing through the hollow shaft the piston is forced outward and the flange member of the coupling and the clutch rings thereon are compressed between the piston and the end plate of the casing so as to strongly bind the parts together and thus join the driving shaft to the driven shaft. When there is no pressure in the casing the piston is forced back by the springs and the clutch released.

Surrounding the drum 3 is a brake band 20 of common construction. One end of this band is fastened to fixed brackets 21 and the other end is connected to a link 22 which is hinged to a lever 23. This lever is pivoted between the brackets and carries a weight 24. A rod 25 connects the lever with a piston 26 in a cylinder 27, the port 28 of which is at the lower end. When air pressure is admitted to the cylinder the piston rises and lifting the weighted lever, releases the clutch. When the pressure is exhausted from the cylinder the weighted lever drops and sets the brake band on the drum.

A pipe 30 extends through a suitable packing into the tubular driven shaft for admitting air to the clutch, and a pipe 31 is connected with the port 28 in the cylinder for admitting air beneath the brake operating piston. These pipes lead from a chamber 32 in the body 33 of the control valve casing, and a pipe line 34 leads from the reservoir or source of compressed air 35 through the head 36 of the control valve casing. A small automatic check valve 37 of common form that will remain open as long as air is flowing gently through it but will close upon a sudden rush of air, is arranged in the pipe line between the control valve and the reservoir.

Through the wall of the control valve casing are one or more exhaust ports 38 that open to the atmosphere, and in the casing is a valve disk 39. This valve disk near one edge has packing washers 40 that are adapted to close the exhaust ports, and at its center has a small perforation 41. The edges of this disk are spherical so that it can rock in the chamber, and a set screw 42 is turned into the casing so as to form a fulcrum for the edge of the valve disk opposite the packing washers, the screw being adjusted so that the washers will lie flat against the seats around the exhaust ports when the valve is closed. A spring 43 is arranged to thrust against the disk and to assist in opening the exhaust ports.

Connected with the pipe line 34 between the automatic check valve and the control valve, is a service line 44 and connected with this service line there are one or more safety or outlet valves 45. The safety valves may be located adjacent to each machine desired to be controlled, or at any other suitable locality. The safety valve shown has a casing 46 with a port 47 that opens to the atmosphere. This port is normally closed by a poppet valve disk 48. The chamber above the valve disk is connected with the service line. The safety valve casing is attached to any suitable support, as bracket 49, and the stem 50 of the valve disk projects into engagement with a cam disk 51 that is attached to the end of an arbor 52 rotatably mounted in the support. Fastened to this arbor is an arm 53 of a handle bar 54 that may extend across the machine in convenient position to be reached by the operative.

The safety valves are normally shut. By turning the hand wheel 55 of the automatic check valve 37 air pressure is admitted to the service line and to the control valve. This pressure keeps the safety valves closed and pushes the disk of the control valve over so that the washers close the ports through the control valve casing to the atmosphere. When the exhaust ports have closed air pressure leaks through the hole in the center of the disk and also around the edges which are not perfectly tight. This air passes through the piping to the brake cylinder and lifting the piston releases the brake band from the drum of the clutch. The pressure also passes into the clutch back of the piston and sets the clutch. There is sufficient leakage past the disk of the control valve to more than compensate for any leakage in the clutch and braking elements so the pressure equalizes on both sides of the control valve disk.

In case of accident, or any other reason for shutting down a machine, the operative pulls or pushes, as most convenient, the handle bar and opens the safety valve. This exhausts the pressure in the service line and the sudden reduction of pressure causes the automatic check valve to close and relieve the pressure on the back of the control valve disk. When the pressure is relieved from the back of the control valve disk that disk swings over and opens the exhaust ports in the control valve. Since the ports of the control valve are at the top and the only force holding the disk against the exhaust ports is the unbalanced pressure at these ports the lower half of the disk moves more easily than the upper half, resulting in the tilting of the disk and the breaking of the seal on the exhaust ports very quickly. The spring assists the air pressure to open the ports wide when the seal is broken. Under these conditions not only is the safety or outlet valve at the machine opened but almost instantly the exhaust ports in the control valve are opened. This exhausts the pressure from the brake cylinder and allows the piston to drop and the brake to be set by the weighted brake lever, and at the same time permits rapid discharge of air from back of the clutch piston so that the clutch is released. The clutch remains released and the brake set until the safety or outlet valve is again closed and the check valve is opened to allow the pressure to close the control valve and build up and release the brake and set the clutch.

The invention claimed is:—

1. The combination with a pneumatic clutch of a control valve, a pipe connection between the clutch and one side of the control valve, a pipe connection from a source of compressed air to the other side of the control valve, a check valve in said latter connection, an outlet valve, a pipe connection between the outlet valve and the pipe connection from the check valve to the control valve, and means for opening the outlet valve.

2. The combination with a pneumatic clutch and brake of a control valve, a pipe connection between one side of the control valve and the clutch and brake, a pipe connection from the other side of the control valve to a source of compressed air, a check valve in said latter connection, an outlet valve, a pipe connection between the outlet valve and the pipe connection from the check valve to the control valve, and means for opening the outlet valve.

3. The combination with a pneumatic clutch of a control valve having a port to the atmosphere, a pipe connection between the clutch and one side of the control valve, a pipe connection from a source of compressed air to the other side of the control valve, a check valve in said latter connection, an outlet valve having a port to the atmosphere, a pipe connection between the outlet valve and the connection from the check valve to the control valve, and means for opening the port of the outlet valve and causing the opening of the port of the control valve.

4. The combination with a pneumatic clutch and brake mechanism for the clutch of a control valve having a port to the atmosphere, a pipe connection between one side of the control valve and the clutch, a pipe connection between the same side of the control valve and the brake mechanism, a pipe connection from the other side of the control valve to a source of compressed air, a check valve in said latter connection, an outlet valve having a port to the atmosphere, a pipe connection between the outlet valve and the pipe connection from the check valve to the control valve, and means for opening the outlet valve port and causing the opening of the control valve port and exhausting the air pressure from the clutch and brake mechanism.

5. The combination with a pneumatic clutch having a chamber containing a piston, a control valve, a pipe connection from one side of the control valve to the chamber back of the piston, a pipe connection from a source of compressed air to the other side of the control valve, a check valve in said latter connection, an outlet valve having a port to the atmosphere, a pipe connection between the outlet valve and the pipe connection from the check valve to the control valve, and means for opening the port of the outlet valve and exhausting the air pressure back of the clutch piston.

6. The combination with a pneumatic clutch of a control valve having a ported valve disk, a pipe connection between the clutch and the control valve on one side of the valve disk, a pipe connection from a source of compressed air to the control valve on the other side of the valve disk, a check valve in said latter connection, an outlet valve, a pipe connection between the outlet valve and the pipe connection from the check valve to the control valve, and means for opening the outlet valve.

7. The combination with a pneumatic clutch of a control valve having a port to the atmosphere and containing a ported valve disk, a pipe connection between the clutch and the control valve on one side of the valve disk, a pipe connection from a source of compressed air to the control valve on the other side of the valve disk, a check valve in said latter connection, an outlet valve having a port to the atmosphere, a pipe connection between the outlet valve and the pipe connection from the check valve to the control valve, and means for opening the port of the outlet valve.

8. The combination with a pneumatic clutch of a control valve, a pipe connection between the clutch and one side of the control valve, a pipe connection from a source of compressed air to the other side of the control valve, a check valve in said latter connection, an outlet valve having a port to the atmosphere, a pipe connection between the outlet valve and the pipe connection from the check valve to the control valve, a cam and means for rotating the cam and causing the opening of the outlet valve.

9. The combination with a pneumatic clutch of a control valve having a port to the atmosphere and containing a rocking valve disk adapted to open and close said port, a pipe connection between the clutch and one side of the control valve, a pipe connection from a source of compressed air to the other side of the control valve, a check valve in said latter connection, an outlet valve having a port to the atmosphere, a pipe connection between the outlet valve and the pipe connection from the check valve to the control valve, and means for opening the outlet valve.

10. The combination with a pneumatic clutch of a control valve, a pipe connection between the clutch and one side of the control valve, a pipe connection from a source of compressed air to the other side of the control valve, an automatic check valve in said latter connection, a poppet valve, a pipe connection between the poppet valve and the control valve, and means for opening the poppet valve and exhausting the system of air pressure.

11. The combination with a pneumatic clutch of a control valve, a pipe connection between the clutch and one side of the control valve, a pipe connection from a source of compressed air to the other side of the control valve, a check valve in said latter connection, an outlet valve, a pipe connection between the outlet valve and the pipe connection from the check valve to the control valve, means for opening the outlet valve, a brake drum connected with the clutch, a brake band surrounding the drum, a weighted lever for tightening the band on the drum, a cylinder and piston for lifting said lever, and a pipe connection between the control valve and said cylinder.

12. The combination with a pneumatic clutch having a chamber containing a piston and a drum surrounded by a brake band, a cylinder and piston for controlling the brake band, a control valve with pipe connections from one side to the clutch chamber back of the piston and to the brake cylinder back of the piston, a pipe connection from the other side of the control valve to a source of compressed air, a check valve located in said latter pipe connection, an outlet valve, a pipe connection between the outlet valve and the pipe connection from the check valve to the control valve, and means for opening the outlet valve.

13. The combination with a pneumatic clutch having a chamber containing a piston and a drum surrounded by a brake band, a weighted lever for tightening the brake band on the drum, a cylinder and piston for controlling said lever, a control valve with pipe connections from one side to the clutch chamber back of the piston and to the brake cylinder back of the piston, a pipe connection from the other side of the control valve to a source of compressed air, a check valve located in said latter pipe connection, an outlet valve, a pipe connection between the outlet valve and the pipe connection from the check valve to the control valve, and means for opening the outlet valve.

14. The combination with a pneumatic clutch and brake mechanism of means for admitting air under pressure to said mechanism and setting the clutch and releasing the brake, and means for exhausting air pressure from said mechanisms and releasing the clutch and setting the brake.

WILLIAM A. GORDON.